United States Patent
Conley et al.

(10) Patent No.: US 6,824,119 B2
(45) Date of Patent: Nov. 30, 2004

(54) THROTTLE PLATE HAVING REDUCED AIR RUSH NOISE AND METHOD

(75) Inventors: David A. Conley, Chelsea, MI (US); Christopher Edward Shaw, Canton, MI (US); Stephen Joseph Hamby, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 132 days.

(21) Appl. No.: 10/224,267

(22) Filed: Aug. 20, 2002

(65) Prior Publication Data

US 2003/0042448 A1 Mar. 6, 2003

Related U.S. Application Data

(60) Provisional application No. 60/316,120, filed on Aug. 30, 2001.

(51) Int. Cl.⁷ .................................................. F16K 1/22
(52) U.S. Cl. ...................................... 251/305; 123/337
(58) Field of Search ................. 251/118–127, 305–308; 123/337

(56) References Cited

U.S. PATENT DOCUMENTS

| | | |
|---|---|---|
| 1,131,371 A | 3/1915 | Hatfield |
| 2,986,373 A | 5/1961 | Masheder |
| 3,238,955 A | 3/1966 | Lassiter, Jr. |
| 3,298,677 A | 1/1967 | Anderson |
| 3,960,177 A | 6/1976 | Baumann |
| 4,243,203 A * | 1/1981 | Mack .......................... 251/305 |
| 5,465,756 A | 11/1995 | Royalty et al. |
| 5,881,995 A * | 3/1999 | Tse et al. ..................... 251/305 |
| 6,354,267 B1 * | 3/2002 | Kotchi et al. ............... 123/337 |

FOREIGN PATENT DOCUMENTS

| | | |
|---|---|---|
| DE | 3720380 A1 | 12/1987 |
| JP | 11-37307 | 2/1999 |
| JP | 11-101350 | 4/1999 |
| JP | 2001-204975 | 7/2000 |
| JP | 2001-20761 | 1/2001 |
| JP | 2001-98959 | 4/2001 |
| JP | 2001-159475 | 6/2001 |

OTHER PUBLICATIONS

Modeling the Time–Dependent Flow Through a Throttle Valve, S.H. Richardson and S. Pierson, R. Alsemgeest and C.T. Shaw.

* cited by examiner

Primary Examiner—Paul J. Hirsch
(74) Attorney, Agent, or Firm—Brinks Hofer Gilson & Lione

(57) ABSTRACT

A throttle body for use in the air intake system of a motor vehicle comprising a throttle body defining a throttle bore. The throttle plate is rotatably mounted within the throttle bore, having an outside diameter smaller than an inside diameter of the throttle bore. A plurality of fins, located on the throttle plate, extend from the throttle plate in a direction generally perpendicular to a plane defined by said throttle plate. The fins are optimized in number, thickness, spacing, length, shape, and angle to reduce air-rush noise without impacting engine performance.

19 Claims, 7 Drawing Sheets

THROTTLE PLATE HAVING REDUCED AIR RUSH NOISE AND METHOD

CROSS REFERENCE TO RELATED APPLICATION

This application claims the benefit of U.S. provisional patent application No. 60/316,120, filed Aug. 30, 2001, and entitled "Method of Reducing Air-Rush Noise Created by Throttle Plate".

BACKGROUND OF THE INVENTION

1. Field of the Invention

The present invention is directed to reducing noise in a motor vehicle, and in particular, a new throttle plate and method of design to reduce air rush noise generated as air moves past a partially opened throttle plate into the vehicle intake manifold.

2. Background and Description of the Prior Art

Electronic fuel injection systems in vehicles have replaced carburetor systems in an effort to reduce engine emissions and increase fuel efficiency. When the driver depresses the gas pedal on a fuel injected vehicle, the throttle valve opens inside the throttle body, letting in more air. The air travels through the engine intake manifold, where it mixes with fuel from the fuel injectors and enters the engine cylinders to increase power to the vehicle. When the air rushes through the throttle body into the manifold, increased turbulent air flow is created, which can make significant noise.

Noise reduction has been a major goal of automakers in motor vehicles for the past several years. With global competition in vehicle sales, automakers often try to differentiate their vehicles from the competition by their "sound characteristics." As major vehicle noises are reduced, other long-standing background noises must be addressed. Air rush noise through the intake system when the throttle plate is opened is one of those noises.

High frequency flow noise can be created when a butterfly valve (the throttle plate) is opened from the fully closed position to some partially open position. Due to its inherent lower material density, this can be especially troublesome in composite-based air intake systems. The convergence of turbulent air streams through the openings created on either side of the throttle plate creates what is described as a 'whoosh' noise by customers. The condition can exist at 'tip-in' (the rapid opening of the fully closed throttle plate) or at a steady state, part-throttle condition.

Several designs currently exist to reduce the air rush noise in a vehicle. One method is seen in U.S. Pat. No. 5,722,357 issued to Choi. This patent describes a gasket-like piece that is added between the throttle body and the manifold to diffuse the air flow downstream from the throttle plate. Vanes project from the interior of the circular opening to diffuse the air flow and reduce the noise. Since the vanes are not located at the source of noise, this method is less effective at reducing the noise. The addition of these protrusions can also act to partially impede the flow resulting in an increased pressure drop leading to a minor loss of power when the throttle plate is fully open. This method, however, requires an extra component to be installed on every vehicle. This is not cost-effective for mass production.

The use of protrusions downstream of the throttle plate is also discussed in U.S. Pat. No. 5,970,963 issued to Nakase et al. Several different types of protrusions from the downstream side of the throttle valve are discussed. These protrusions severely complicate the die cast tooling necessary to make the throttle body. Slides will need to be added to the die cast tool and extra machining of the casting will be necessary. This adds cost to the component and reduces production volume. The addition of these protrusions can also act to partially impede the flow resulting in an increased pressure drop further leading to a minor loss of power when the throttle plate is fully open.

Adding protrusions to the throttle plate to reduce the air rush noise has been addressed in U.S. Pat. No. 5,881,995 issued to Tse et al. and U.S. Pat. No. 5,465,756 issued to Royalty et al. Both patents describe noise reduction components added to the throttle plate to attenuate the noise. The fins on the designs, however, are of a fixed geometry to the throttle plate. While these will reduce some of the air rush noise, they may not eliminate it in all vehicle models. Manifolds and throttle bodies vary in shape, which changes the fluid dynamics and noise in the vehicles necessitating an adaptable throttle plate design. The subject matter of the above referenced patents may also have reduced power when the throttle plate is fully open due to the pressure drop caused by protrusions of these types. There still exists a need to optimize these protrusions. No optimization techniques are discussed.

The need thus still exists for a flexible throttle plate design that reduces the air rush noise across vehicle models. There needs to be a method to accomplish the noise reduction while not causing a power loss when the throttle plate is fully open. There also needs to be a method of optimizing and customizing the design to reduce the air rush noise in each individual vehicle to accommodate the different manifold and throttle body designs.

SUMMARY OF THE INVENTION

In accordance with the present invention, these and other objects are accomplished by providing an apparatus and a method for reducing the air rush noise in a variety of motor vehicles when the throttle plate is open. This reduction is for throttle plates that are gradually opened, held in a partially-open position or are rapidly opened.

On a vehicle, the throttle plate opens when the engine needs to deliver more power. The air flow over the throttle plate inside the throttle bore can cause increased turbulence and vorticies. Fins added to the throttle plate can prevent the vorticies from being generated and act to straighten the flow, thus mitigating the turbulence in the flow downstream of the plate. The fins delay convergence of the turbulent air to a point further downstream when the energy has been dissipated. This, in turn, mitigates the source of the noise. With the fins attached to one or both sides of the throttle plate, the designer has the ability to tune the acoustical response as well as the restriction imposed by the fins minimizing the effect on the engine's power output. The fins may be of constant width and spaced consistently across the throttle plate, or the spacing and width may vary.

The present invention uses fins in one or more orientations on the throttle plate to manage the flow of the air through the throttle bore to the manifold to mitigate the source of the noise. The throttle bore may be cylindrical, oval, elliptical, or a similar shape. A variety of computational fluid dynamics and other computer aided engineering methods, along with bench testing, can be used to simulate the flow of the air through the specific throttle body/ manifold design to simulate the air flow and optimize the design of the fins of the throttle plate. This optimization depends upon many factors including the duct section geometry of the induction system, the airflow rate, and customer design specifications for pressure drop and radiated sound levels. The fins can be fabricated of various materials such as composite plastics or die cast aluminum. The fins can be attached to the throttle plate by various methods such as a mechanical joint, adhesive or welding. The fins could also be integrated into the plate as a one-piece design.

Additional benefits and advantages of the present invention will become apparent to those skilled in the art to which the present invention relates from the subsequent description of the preferred embodiments and the appended claims, taken in conjunction with the accompanying drawings.

BRIEF DESCRIPTION OF THE DRAWINGS

FIG. 4A is a cross-sectional view of the throttle plate of the present invention within the throttle body in the open position;

DETAILED DESCRIPTION OF THE PREFERRED EMBODIMENT

Figure 1:
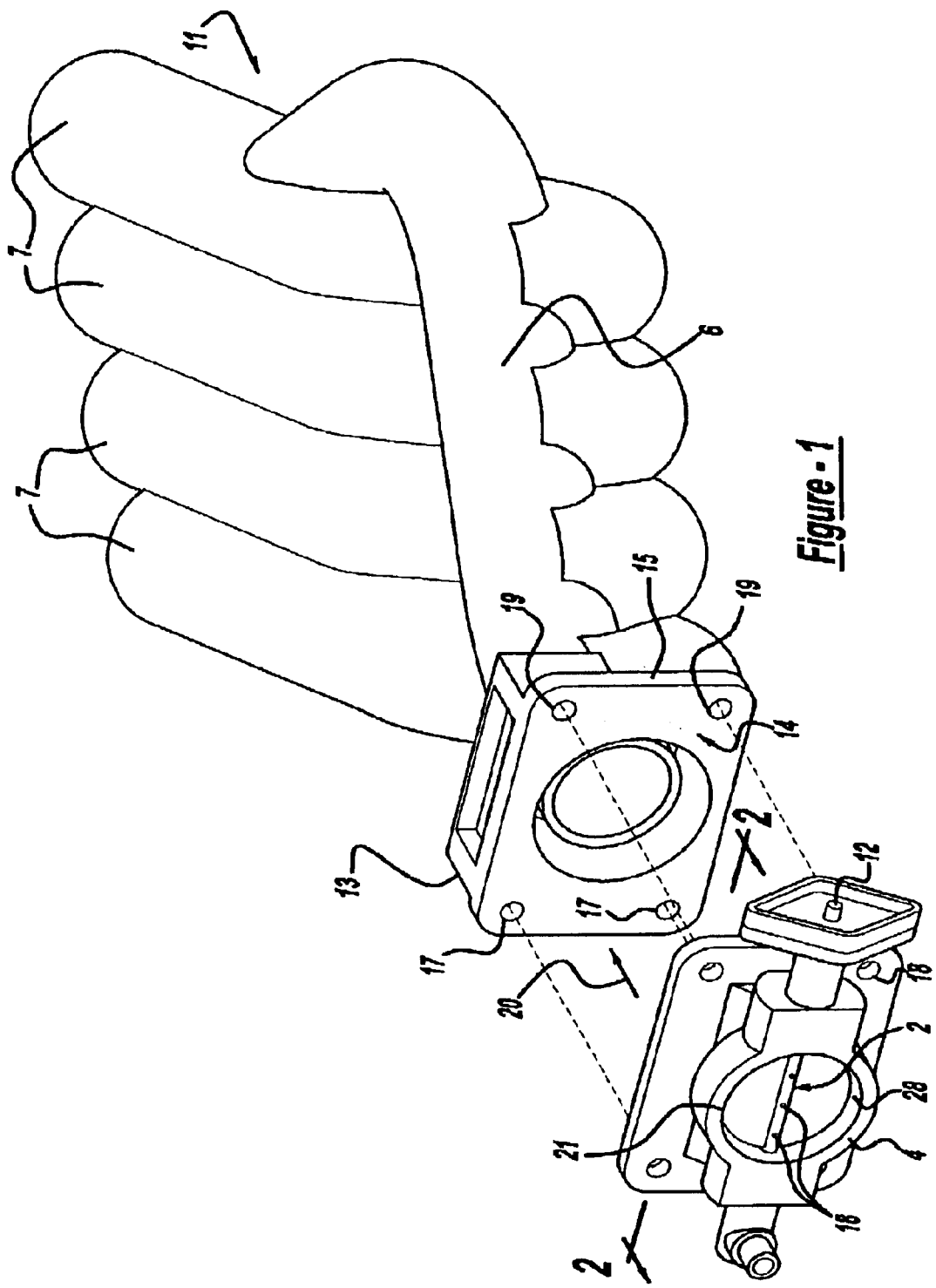
FIG. 1 is a perspective view of the throttle body and manifold system showing the present invention.

Referring now in detail to the drawings, shown in FIG. 1, the throttle body 4 and intake manifold 11 portion of the air intake system of an electronically fuel injected vehicle is shown. The manifold 11 is the portion of the air intake system that interacts with the fuel components. Air enters the plenum portion 6 of the manifold 11 from the throttle body 4. The plenum portion 6 of the manifold 11 evens out the pulses in the air to help fuel economy and emissions before the air enters the inlet tracks 7. The air from the inlet tracks 7 mixes with the fuel spray from the fuel injectors mounted on a fuel rail at the exit of the inlet tracks 7 (not shown). Thereafter, the fuel-air mixture is combusted in the combustion chamber of the engine.

The manifold 11 is attached to the throttle body 4 on the plenum 6 side of the manifold 11 at the manifold inlet 13. The throttle body 4 mounts via a mounting flange 15 to a mounting surface 14 of the manifold inlet 13. Fasteners, such as bolts, screws or other means, fastened through manifold attachment holes 17 and 19, respectively formed in the mounting surface 14 and mounting flange 15, secure the throttle body 4 to the manifold inlet 13 of the manifold 11.

The throttle body 4 determines how much air will flow into the plenum 6 and therefore the engine. A throttle plate 2 fits snugly inside a throttle bore 28 defined within a cylindrical ring 21 of the throttle body 4. The throttle plate 2 is attached to a throttle shaft 12 by fasteners 18, such as bolts, screws and other means. Rotation of the shaft 12 causes the throttle plate 2 to open and close to regulate the air stream. When the driver depresses the accelerator pedal of the automobile, the throttle shaft 12 is rotated, thus opening the throttle plate 2 and allowing air to flow into the manifold 11. The air flows through the throttle bore 28 into the manifold inlet 13 in flow direction 20.

Figure 2:
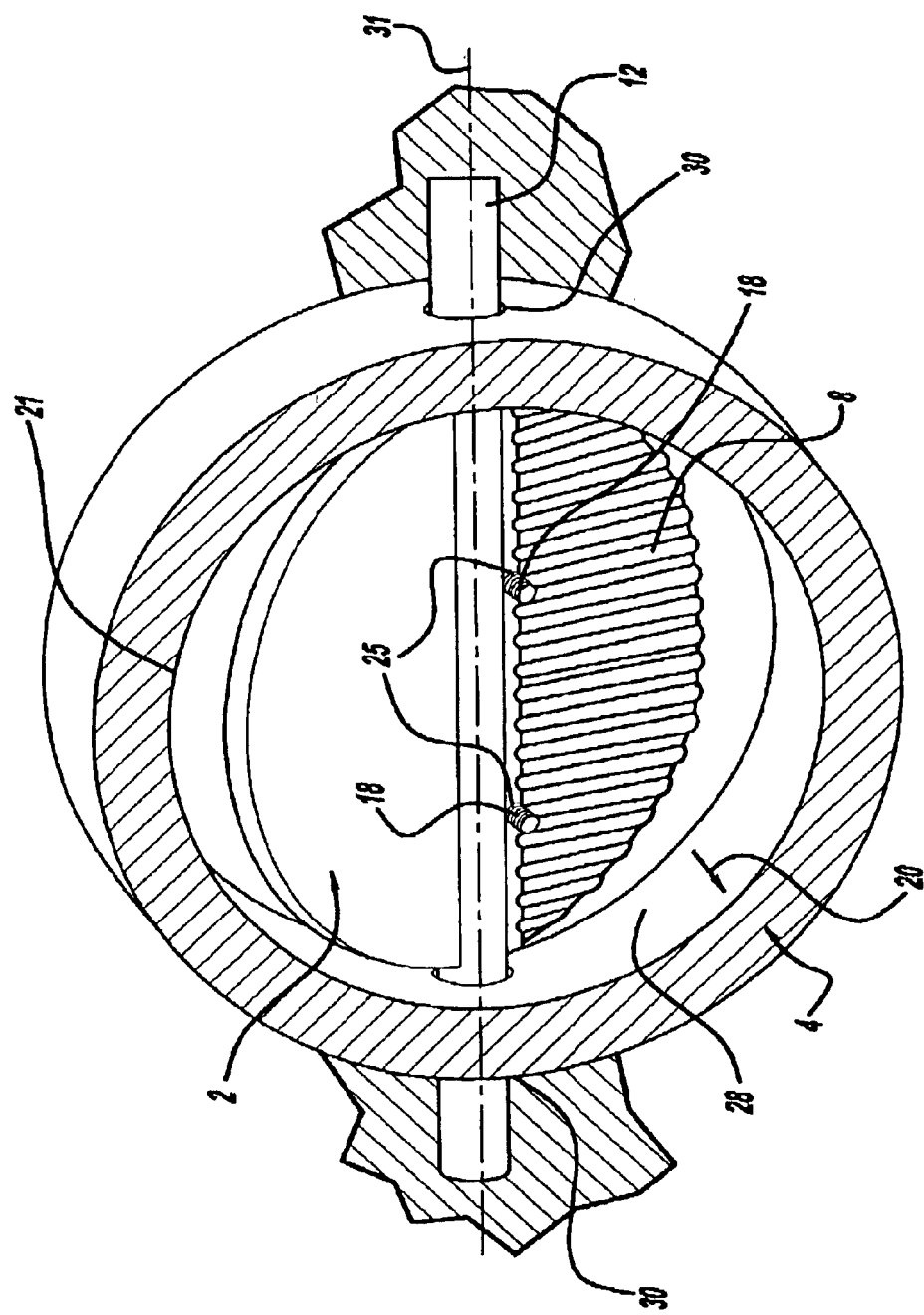
FIG. 2 is a sectional view cut through the throttle bore of FIG. 1

As seen in FIG. 2, attachment of the throttle plate 2 inside of the cylindrical ring 21, to the throttle body 4 is shown in a sectional view as seen from the manifold 11 attachment side thereof. The throttle bore 28 has two rod holes 30 extending through its sides. The rod holes 30 extend along a common axis 31 and the throttle rod 12 fits through rod holes 30 in the throttle bore 28. Attached to the throttle rod 12, the throttle plate 2 fit snugly inside throttle bore 28 to substantially block air flow when the throttle plate 2 is in the closed position. As shown in FIG. 2, the throttle plate 2 is partially open.

The throttle plate 2 may be attached to the throttle rod 12 by screws or bolts 18 extending through mounting rings 25 formed within the throttle rod 12 and into the throttle plate 2. Formed on or mounted to the throttle plate 2 are fins 8. Preferably, the fins 8 are on the trailing edge of the throttle plate 2. As such, when the throttle rod 12 is turned and the throttle plate 2 is opened, the fins 8 operate to mitigate the noise by straightening the air flow in direction 20.

Figure 3:
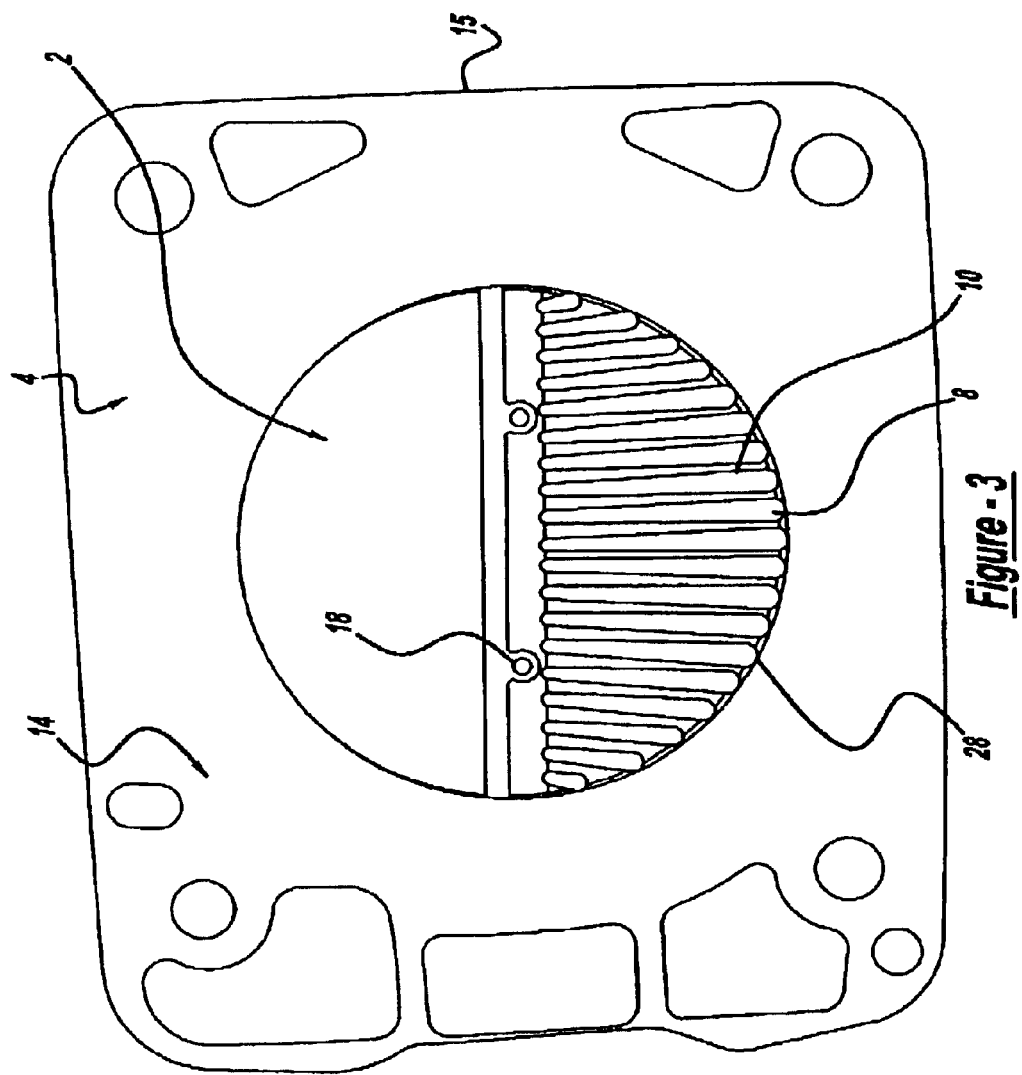
FIG. 3 is an end view of the throttle plate of the present invention within the throttle body in the closed position.

Referring now to FIG. 3, an end view from the mounting flange 15 of the throttle body 4 is shown. The throttle plate 2 in this view is in the closed position inside the throttle bore 28 and air flow is blocked by the snug fit between the throttle plate 2 and the throttle bore 28. The fins 8 can be seen facing the mounting flange 15 of the throttle body 4. When the throttle plate 2 is in this closed position, the fins 8 have no effect on the air intake system.

Figure 4:
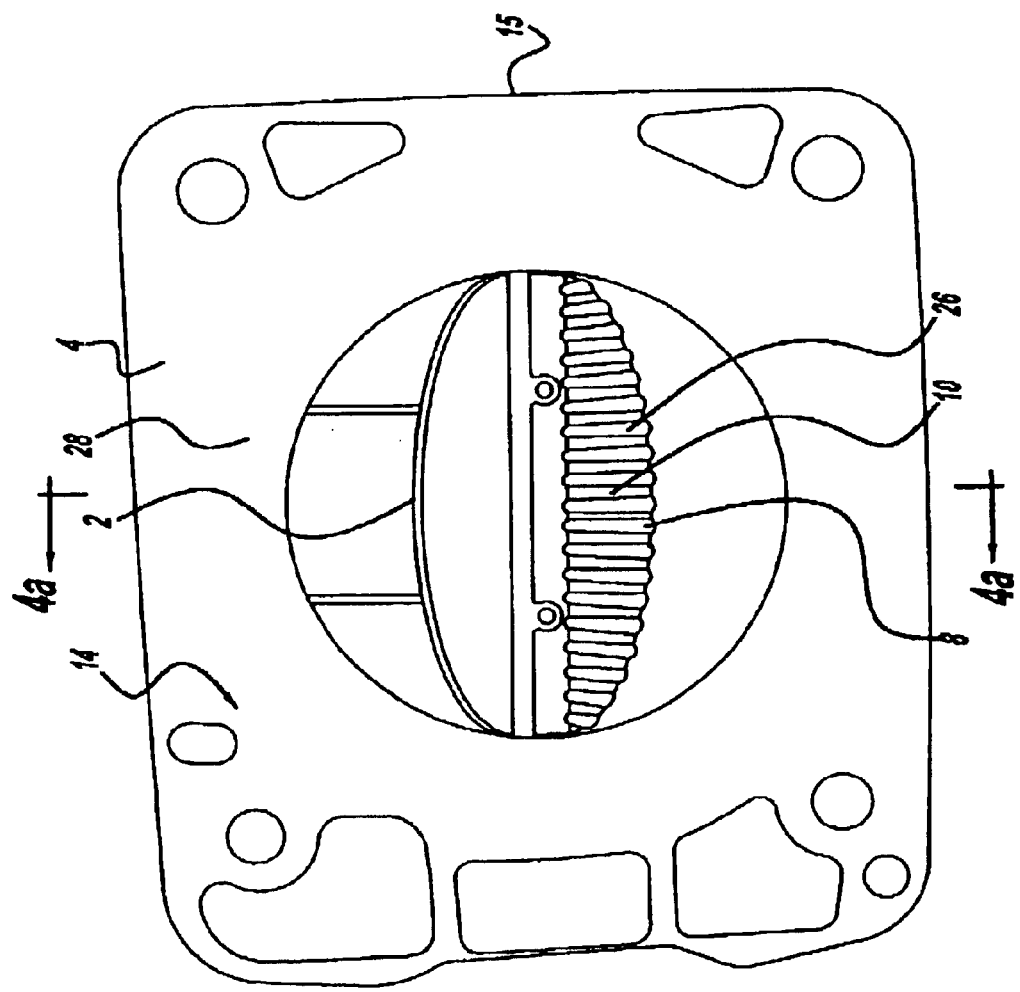
FIG. 4 is an end view of the throttle plate of the present invention within the throttle body in the open position.

FIG. 4 is a view from the mounting flange 15 of the throttle body 4, similar to that seen in FIG. 3. In this view, the throttle rod 12 has been rotated almost to the open position inside the throttle bore 28. Rotated as such, the fins 8 move away from an orientation facing the mounting flange 15 towards an angle perpendicular or 90° relative to the closed position (wide open throttle).

Referring now to FIG. 4A, the partially open throttle plate 2 from FIG. 4 is shown in a cross-sectional view. The throttle rod 12 is rotated to open the throttle plate 2. Air flows in air direction 20 through the throttle bore 28. The fins 8 manage the air flow through the throttle bore 28 to reduce the air rush noise generated by the air flow over the throttle plate 2 which may be heard in the vehicle.

When the throttle plate 2 is opened, as the air travels in air flow direction 20, it travels through the fins 8, which are aligned in the air flow direction 20 path. With the throttle plate 2 open, the fins 8 overhang the throttle plate 2 by overhang distance 26 or height. The intrusion of fins 8 by fin overhang distance 26 modifies the air flow by preventing the vortices from being produced from turbulent flow to laminar flow, quieting the air rush noise of the air flow through the throttle bore 28 into manifold 6.

Figure 5:
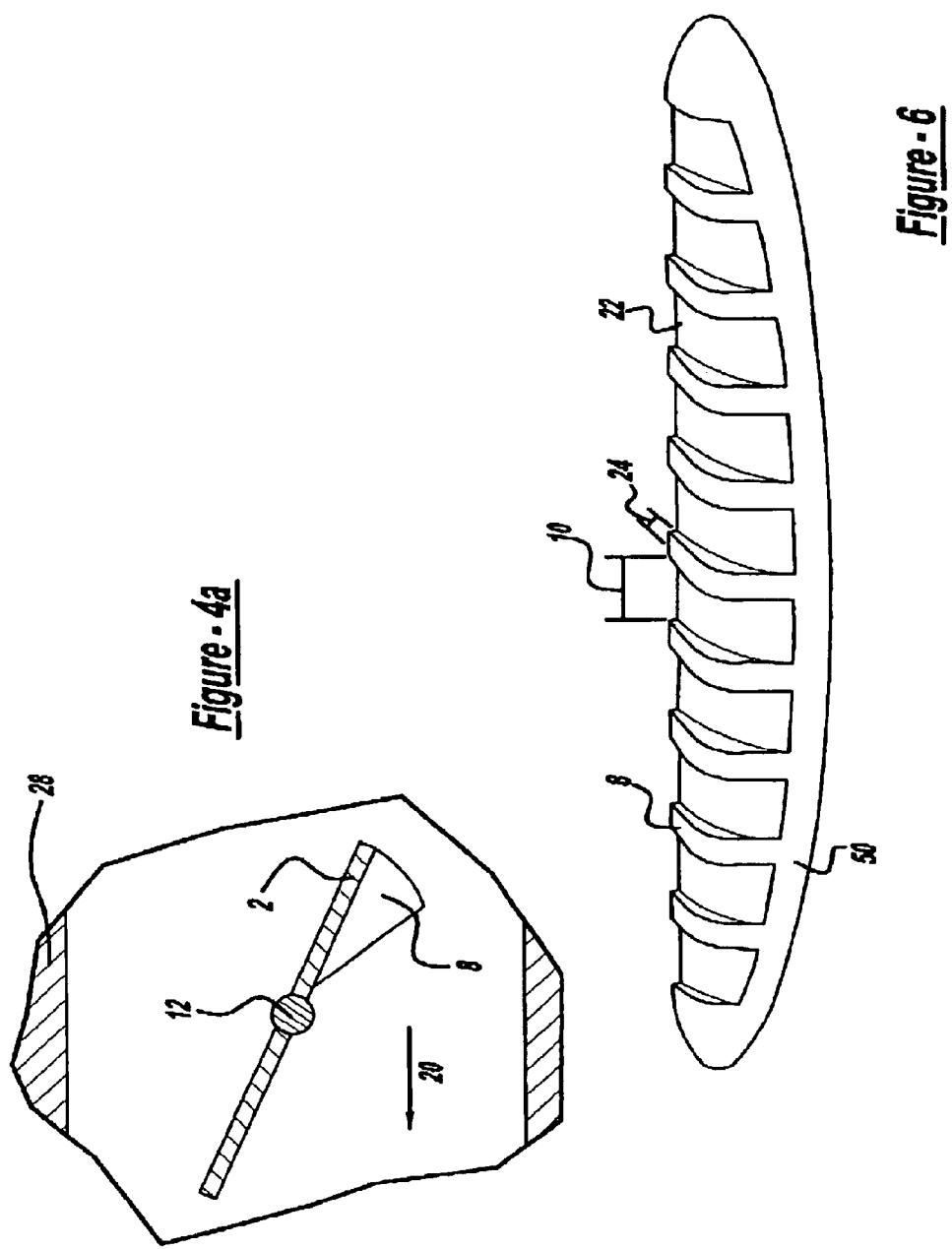
FIG. 5 is a perspective view of the throttle plate according to another embodiment of the present invention.

Referring now to FIG. 5, a perspective view of one embodiment of the fins 8 of the throttle plate 2 is shown. The fins 8 themselves are formed on a separate fin attachment plate 50. The fin attachment plate 50 is fastened, using an adhesive or a mechanical fastener, onto the rear side of the throttle plate 2 and on the lower side which forms the leading edge side 51.

Figure 6:
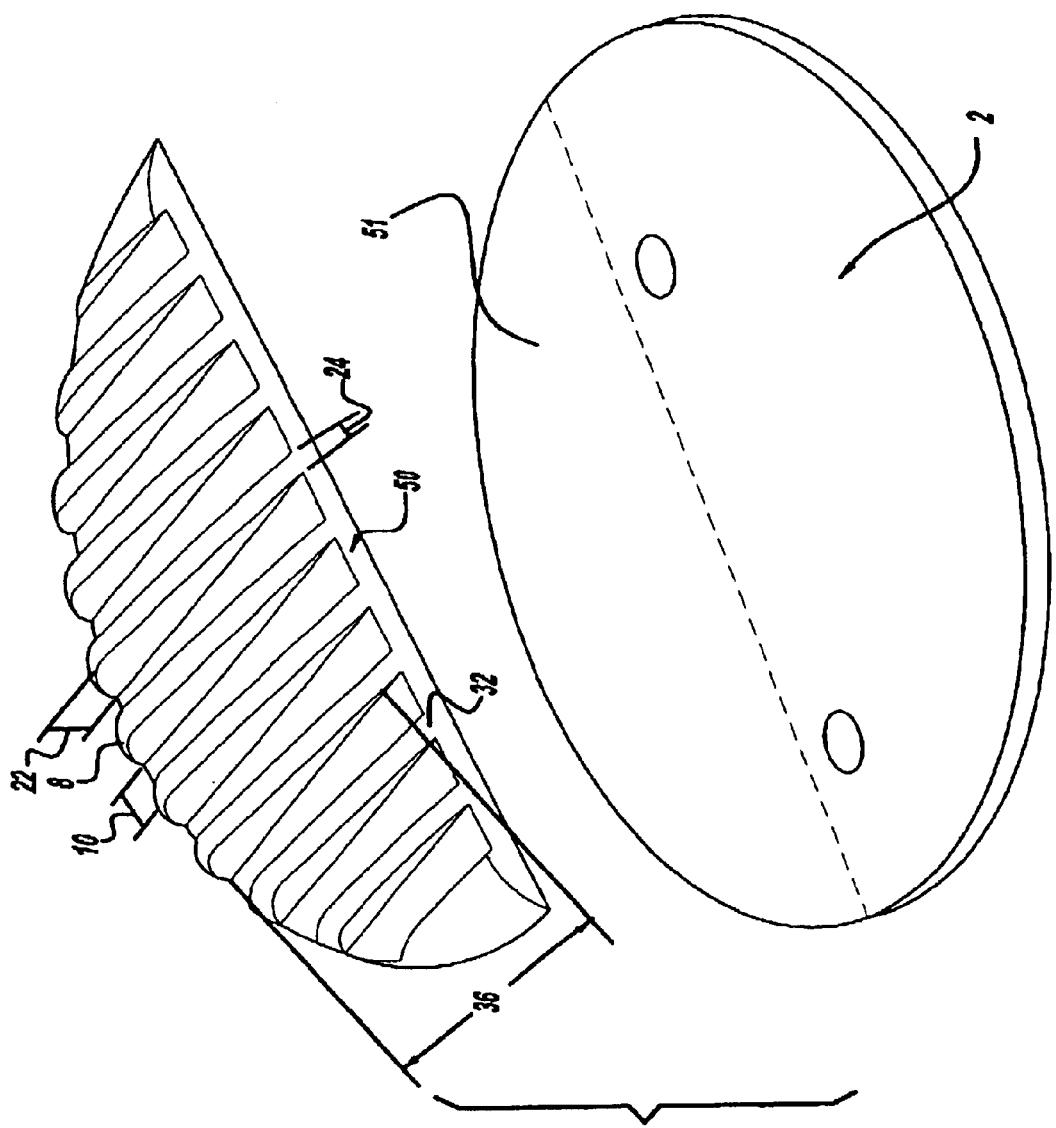
FIG. 6 is a side view of the embodiment shown in FIG. 5.

After attachment, the fins 8 progress from approximately the center of the throttle plate 2 and rise from there until reaching the end of the throttle plate 2, a fin tip height 22 at a fin angle 24, calculated by using the fin start location 32 and measuring angle between a ray along the fin length 36 and a ray toward the fin tip height 22. Because of the generally round shape of the throttle plate 2, the fin length 36 will generally be different for each fin 8. FIG. 6 is an opposing view of the fin attachment plate 50 to that of FIG. 5. The fins 8 are seen as being equally spaced 10 between each fin 8. The fin width 24 is shown to be consistent throughout the fin attachment 50.

Figure 7:
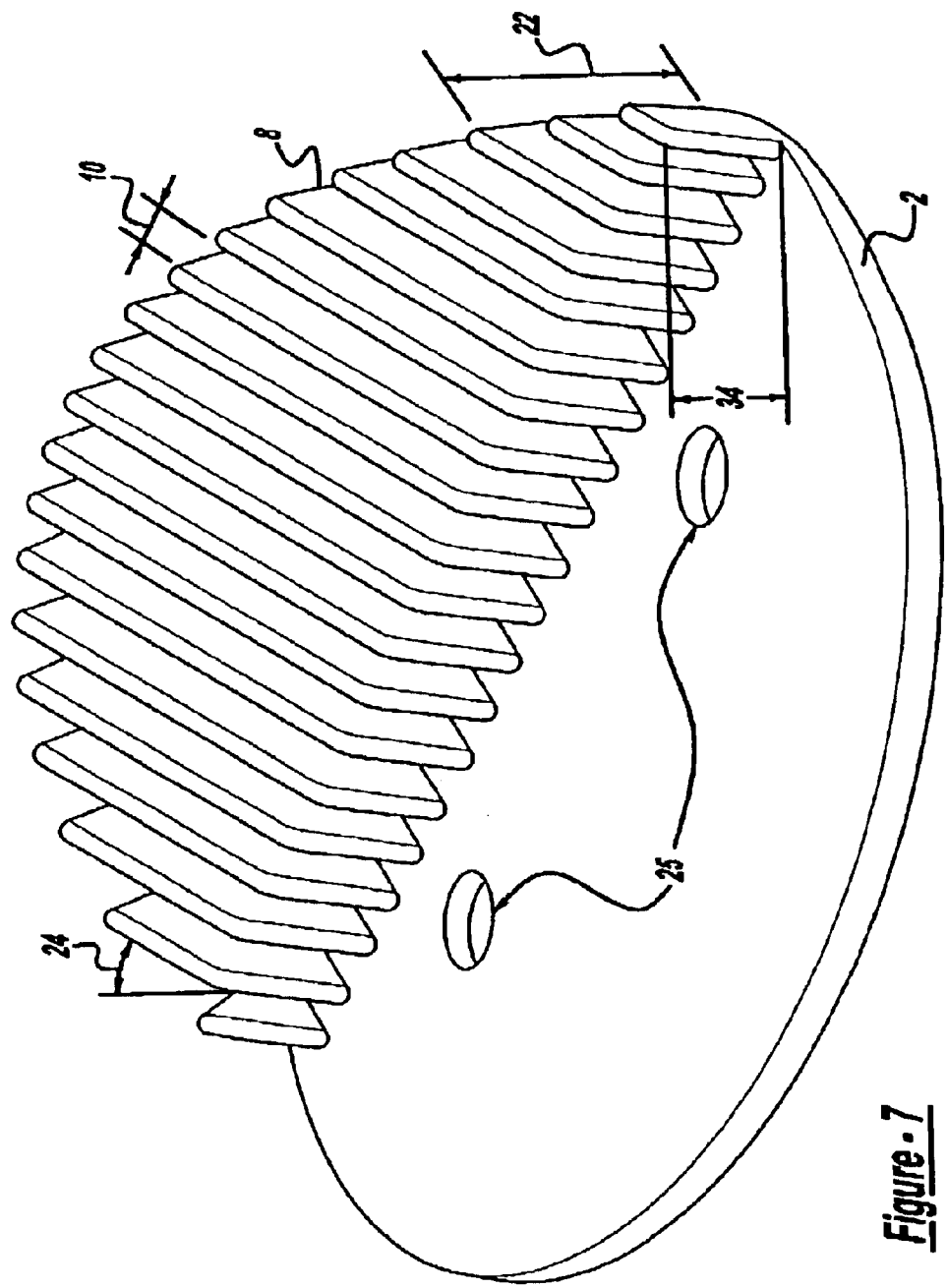
FIG. 7 is a perspective view of an embodiment of the throttle plate of the present invention.

Seen in FIG. 7 is a perspective view of a further embodiment of the present invention. In this embodiment, the fins 8 are manufactured as a unitary part of the throttle plate 2. The throttle plate 2 with the unitary fins 8 can be a one-piece die casting or made by another manufacturing method. There is no separate fin attachment piece with this embodiment.

In this latter embodiment, the fins 8 start at fin start height 34, generally along the diameter of the throttle plate 2. The fins 8 then rise diagonally towards the outer edge of the throttle plate 2 to fin edge height 22. The fins 8 are again equally spaced with fin spacing 10. The throttle plate attachment holes 25 are shown near the center of the throttle plate 2. Formed in this manner, the fins 8 extend completely across the opening created during rotation of the throttle plate 2, regardless of the open angle of the throttle plate 2.

While the above description constitutes the preferred embodiments of the present invention, it will be appreciated that the invention is susceptible to modification, variation and change without departing from the proper scope and fair meaning of the accompanying claims.

We claim:

1. A throttle body for use in an air intake system of a motor vehicle, the throttle body comprising:
   a throttle body surface defining a throttle bore;
   a throttle plate rotatably mounted within said throttle bore, said throttle plate having a variable rotational angle and forming an opening of variable size based on the rotational angle of said throttle plate relative to the throttle body, said throttle plate having an outside diameter smaller than an inside diameter of said throttle bore; and
   a plurality of fins extending from said throttle plate in a direction generally perpendicular to a plane defined by said throttle plate, wherein at least one of said fins is shaped such as to substantially extend across the opening regardless of the rotational angle of said throttle plate relative to the throttle body.

2. The throttle body as described in claim 1 wherein said fins extend from both sides of said throttle plate in a direction generally perpendicular to a plane defined by said throttle plate, wherein said fins are optimized in size and shape to reduce air-rush noise without significantly impacting engine performance.

3. The throttle body as described in claim 1 wherein said fins are generally parallel to one another.

4. The throttle body as described in claim 1 wherein said fins are unitarily formed within said throttle plate.

5. The throttle body as described in claim 1 wherein said fins are attached to said throttle plate.

6. The throttle body as described in claim 5 wherein said fins are attached to said throttle plate by a mechanical fastener.

7. The throttle body as described in claim 5 wherein said fins are attached to said throttle plate by an adhesive.

8. The throttle body as described in claim 5 wherein said fins are attached to said throttle plate by welding.

9. The throttle body as described in claim 5 wherein said fins are attached to said throttle plate by over-molding.

10. The throttle body as described in claim 5 wherein the fins are optimally designed to minimize the reduction in a vehicle engine performance in wide-open throttle power performance.

11. A method of optimizing the size and shape of a plurality of fins on a throttle plate in a vehicle comprising:
    identifying a flow pattern within a throttle body and manifold system;
    using the flow pattern information to design a plurality of fins for a throttle plate; and
    locating the fins on the throttle plate.

12. The method as described in claim 11 wherein the flow pattern is identified using computer aided engineering means.

13. The method as described in claim 11 wherein the flow pattern is determined using bench testing.

14. The method as described in claim 11 wherein the number, thickness, spacing, length, shape and angle of the fins is identified using computer aided engineering means.

15. The method as described in claim 11 wherein the number, thickness, spacing, length, shape and angle of the fins are determined using bench testing.

16. The throttle body as described in claim 1, wherein each of the fins is shaped such as to substantially extend across the opening regardless of the rotational angle of said throttle plate.

17. A throttle body for use in an air intake system of a motor vehicle, the throttle body comprising:
    a throttle body surface defining a throttle bore;
    a throttle plate rotatably mounted within said throttle bore, said throttle plate being configured to rotate about a rotational axis, said throttle plate having an outside diameter smaller than an inside diameter of said throttle bore; and
    a plurality of fins extending from said throttle plate in a direction generally perpendicular to a plane defined by said throttle plate, wherein said fins are optimized in size and shape to reduce air-rush noise without significantly impacting engine performance, wherein at least one of said fins has a first height adjacent to an outer rim portion of said throttle plate and a second height adjacent to the rotational axis of said throttle plate, wherein the first height is greater than the second height, and wherein at least one of said fins has a varying thickness.

18. The throttle body as described in claim 17 wherein at least one of said fins has a first thickness adjacent to the outer rim of said throttle plate and a second thickness adjacent to the rotational axis of said throttle plate, and wherein the first thickness is greater than the second thickness.

19. The throttle body as described in claim 18 wherein each of said fins has a first height adjacent to an outer rim portion of said throttle plate and a second height adjacent to the rotational axis of said throttle plate, wherein each of said fins has a first thickness adjacent to the outer rim of said throttle plate and a second thickness adjacent to the rotational axis of said throttle plate, and wherein the first height of each of said fins is greater than the second height and the first thickness of each of said fins is greater than the second thickness.

* * * * *